Figure 1:
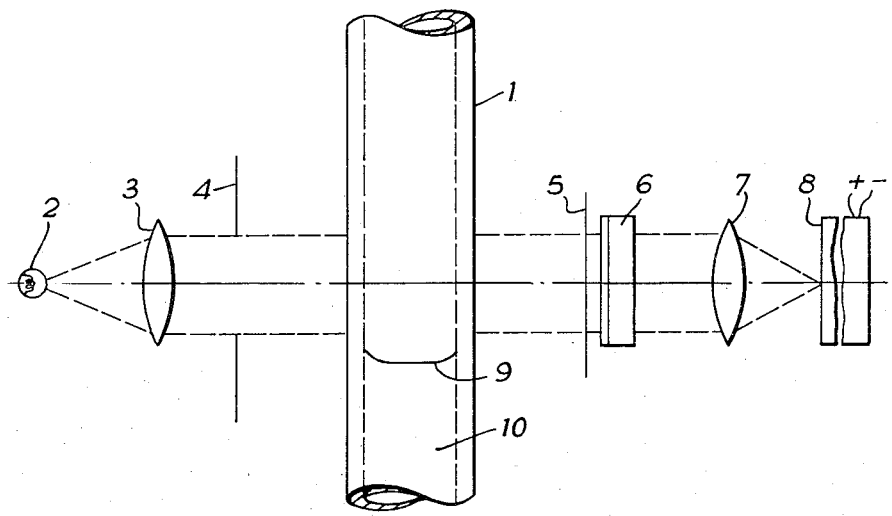

April 18, 1961   R. J. BRACEY ET AL   2,980,802
PHOTO ELECTRONIC SYSTEM
Filed July 18, 1958

INVENTOR
RONALD JOHN BRACEY
DONALD LANG RIGBY  AND

BY  Karl W. Flocks
ATTORNEY

United States Patent Office 2,980,802
Patented Apr. 18, 1961

2,980,802
PHOTO ELECTRONIC SYSTEM
Ronald John Bracey, North Harrow, and Donald Lang Rigby, London, England, assignors to Baird and Tatlock (London) Limited, Chadwell Heath, England, a company of Great Britain Filed July 18, 1958, Ser. No. 749,353
Claims priority, application Great Britain June 26, 1958
6 Claims. (Cl. 250—218)

This invention relates to a photo electronic system for detecting or monitoring the passage of fluid through a tube of a material transparent to radiant energy. The invention is particularly although not exclusively applicable to the accurate determination of the position of the meniscus of a liquid in a burette incorporated in automatic titration apparatus.

Where it is desired to determine the level of a liquid in a vessel having transparent walls it is known to use a photo electric cell in conjunction with a light source and it is usual to arrange for the cell to be masked by an opaque member incorporating an aperture or slot of such a size that light from a source may be focussed thereon through the walls of the vessel. When the liquid level within the vessel interrupts the light beam a shift of focus occurs which reduces the intensity of light falling on the cell and thereby enables an electric switching operation to be effected. However with this arrangement it is not possible to ensure great accuracy of measurement and furthermore the method is only effective when the liquid is coloured or opaque.

It is an object of the present invention to provide an improved photo electronic system for detecting or monitoring the passage of fluid through a tube of a material transparent to radiant energy and is particularly although not exclusively applicable to the accurate determination of the position of the meniscus of a liquid in a burette incorporated in automatic titration apparatus.

According to the present invention there is provided a photo electronic system comprising a source of radiant energy, a tube of substantially circular cross-section and of a material transparent to radiation from the source, means for directing radiation from the source transversely through the tube and on to a photo electronic device capable of responding thereto and a member opaque to said radiation and located in the path thereof between the tube and the device, the member being of such a shape and size and being so disposed that when that part of the tube through which radiation passes is occupied by a first fluid having a refractive index within a first predetermined range said radiation is focussed thereon and insufficient radiation reaches the device to render the latter responsive whereas when said part of the tube is occupied by a second fluid having a refractive index within a second predetermined range said radiation is focussed on the device to render the latter responsive.

Preferably the radiant energy is light in the visible wave length range and said means comprises a lens and diaphragm arrangement for directing a parallel beam of light of suitable transverse dimensions from the source to the tube. The means may also include a cylindrical lane, for example a plano-convex lens, between the tube and the device so that when said part of the tube is occupied by the second fluid the cylindrical lens produces a parallel beam of light to compensate for refraction caused by the tube and the second fluid. Preferably a further lens is disposed between the cylindrical lens and the device to focus this parallel beam on to the device.

The opaque member may for example comprise a wire or other thin strip of material or alternatively the optical elements of the system may be arranged so that the appropriate position for the member is on the surface of the cylindrical lens when said surface may be etched and filled with an opaque substance. The photo electronic device may comprise a photo electric cell.

Figure 2:
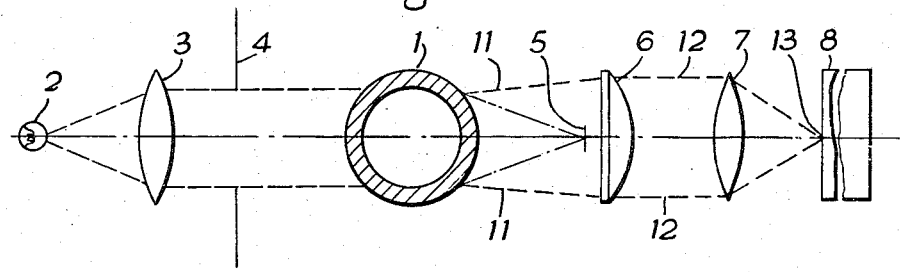

One embodiment of the invention will now be described by way of example with reference to the accompanying drawing in which:

Fig. 1 shows diagrammatically in elevation a photo electronic system according to the invention and Fig. 2 is a plan view in part section of the system of Fig. 1.

Referring to the drawing the system comprises a glass tube 1 which may be a burette in an automatic titration apparatus, a light source 2, a biconvex condenser lens 3 for producing a parallel beam of light directed through the tube 1 and a diaphragm 4 for limiting the size of this beam.

On the far side of the tube from the light source 2 is located a wire strip 5 disposed parallel with the axis of the tube 1, cylindrical plano-convex lens 6, a biconvex lens 7 and a photo electric cell 8.

The meniscus level 9 of a liquid 10 within the tube 1 is shown below the position of the optical system and it will be assumed that the space within the tube 1 above the liquid 10 is occupied by air.

The optical system may be mounted for movement along the length of the tube 1 by means (not shown) and operation of the system will now be described it being assumed that the system is moving down the tube towards the meniscus 9 of the liquid 10. While the system traverses that part of the system occupied by air the tube and the air within it constitute a cylindrical biconcave lens which causes refraction of the light beam in a vertical plane as shown by the dotted lines 11 in Fig. 2. The lens 6 compensates for this refraction to produce a parallel beam 12 which is then focussed by the lens 7 to a substantial point image 13 on the photo electric cell 8.

When the system travels further down the tube 1 until the light beam passes through the liquid 10 the tube and the liquid constitute a cylindrical biconcave lens so that the light passing through it is focussed on to the strip 5 and substantially no light passes further through the system and the cell 8 is not energised. This de-energisation can be utilised to effect a switching operation and for example to initiate operation of apparatus to indicate or print the quantity of liquid 10 discharged from tube 1.

It will be appreciated that the liquid 10 and the air referred to constitute the first and second fluids referred to above and that the strip 5 is disposed at an appropriate distance from the tube to be at the focal line of the lens constituted by the tube 1 and the liquid 10. If desired the system may be arranged so that this focal line occurs on the surface of the lens 6 and this surface can be etched and filled with an opaque substance.

It will further be appreciated that although described for first and second fluids constituted by liquids and gases the system may also operate with gas/gas and liquid/liquid interfaces within the tube 1 so long as the two fluids have different refractive indices and are not miscible. Should the first fluid constituted by the liquid 10 be opaque to light from the source 2 it will be appreciated that the system will still operate although in this case the liquid will itself provide a cut off for the light beam.

Other variations in the arrangements are envisaged, for example the lens system could be disposed at a predetermined position along the length of the tube 1 so as accurately to measure the quantity of fluid discharged from the tube, a change in output from the cell 8 being utilised to operate discharge valve means.

What we claim is:

1. A photo electronic system comprising a source of radiant energy, a tube of substantially circular cross-section and of a material transparent to radiation from said source, a photo electronic device disposed on the side of said tube remote from said source, means for directing a beam of radiation from said source through said tube and on to said device, a first fluid in said tube in the path of said radiation, a first cylindrical lens constituted by said first fluid and said tube, a member opaque to said radiation located in the path thereof between said tube and said device at a distance from the axis of said tube substantially equal to the focal length of said first lens, a second fluid immiscible with said first fluid in said tube, means for causing relative movement in the longitudinal direction of said tube between said first and second fluids of the system to bring said second fluid into said path and a second cylindrical lens constituted by said second fluid and said tube having a focal length different from that of said first lens.

2. A photo electronic system comprising a source of radiant energy, a tube of substantially circular cross-section and of a material transparent to radiation from said source, a photo electronic device disposed on the side of said tube remote from and diametrally opposite said source, means for directing a parallel beam of radiation from said source diametrally through said tube and on to said device, a first fluid in said tube in the path of said radiation, a first cylindrical lens constituted by said first fluid and said tube, a strip member opaque to said radiation located in the path thereof between said tube and said device parallel with and at a distance from the axis of said tube substantially equal to the focal length of said first lens, a second fluid immiscible with said first fluid in said tube, means for causing relative movement in the longitudinal direction of said tube between said first and second fluids of the system to bring said second fluid into said path, a second cylindrical lens constituted by said second fluid and said tube having a focal length different from that of said first lens and a cylindrical convergent lens and a convergent lens disposed successively in said path between said member and said device.

3. A photo electronic system comprising a source of radiant energy, a tube of substantially circular cross-section and of a material transparent to radiation from said source, a photo electronic device disposed on the side of said tube remote from and diametrally opposite said source, means for directing a parallel beam of radiation from said source diametrally through said tube and on to said device, a first fluid in said tube in the path of said radiation, a first cylindrical lens constituted by said first fluid and said tube, a strip member opaque to said radiation located in the path thereof between said tube and said device parallel with and at a distance from the axis of said tube substantially equal to the focal length of said first lens, a second fluid immiscible with said first fluid in said tube, means for causing relative movement in the longitudinal direction of said tube between said first and second fluids of the system to bring said second fluid into said path, a second cylindrical lens constituted by said second fluid and said tube having a focal length different from that of said first lens and a cylindrical convergent lens having its axis parallel with the axis of the tube and a convergent lens disposed successively in said path between said member and said device, the distance between the axis of said convergent lens and a sensitised surface of said device being equal to the focal length of said convergent lens.

4. A photo electronic system according to claim 3 in which said cylindrical convergent lens is of plano-convex formation having its plane surface adjacent said tube and said strip member is located on said plane surface.

5. A photo electronic system comprising a source of radiant energy, a tube of substantially circular cross-section and of a material transparent to radiation from said source, a photo electronic device disposed on the side of said tube remote from said source, means for directing a beam of radiation from said source diametrally through said tube and on to said device, a first fluid in said tube in the path of said radiation, a first cylindrical lens constituted by said first fluid and said tube, a member opaque to said radiation located in the path thereof between said tube and said device at a distance from the axis of said tube substantially equal to the focal length of said first lens, a second fluid immiscible with said first fluid in said tube, means for causing relative movement in the longitudinal direction of said tube between said first and second fluids of the system to bring said second fluid into said path and a second cylindrical lens constituted by said second fluid and said tube having a focal length different from that of said first lens.

6. A photo electronic system comprising a source of radiant energy, a tube of substantially circular cross-section and of a material transparent to radiation from said source, a photo electronic device disposed on the side of said tube remote from and diametrally opposite said source, means for directing a parallel beam of radiation from said source diametrally through said tube and on to said device, a first fluid in said tube in the path of said radiation, a first cylindrical lens constituted by said first fluid and said tube, a strip member opaque to said radiation located in the path thereof between said tube and said device and disposed parallel with said tube at a distance from the axis thereof substantially equal to the focal length of said first lens, a second fluid immiscible with said first fluid in said tube, means for causing relative movement in the longitudinal direction of said tube between said first and second fluids of the system to bring said second fluid into said path and a second cylindrical lens constituted by said second fluid and said tube having a focal length different from that of said first lens.

References Cited in the file of this patent

UNITED STATES PATENTS

| 1,955,315 | Styer | Apr. 17, 1934 |
| 2,193,315 | Evelyn | Mar. 12, 1940 |
| 2,197,190 | Mott-Smith | Apr. 16, 1940 |
| 2,411,986 | Cowherd | Dec. 3, 1946 |
| 2,588,672 | Turvey | Mar. 11, 1952 |
| 2,764,178 | Paul et al. | Sept. 25, 1956 |
| 2,817,237 | Stevens | Dec. 24, 1957 |

FOREIGN PATENTS

| 339,976 | Great Britain | Dec. 8, 1930 |